(12) United States Patent
Sugiyama et al.

(10) Patent No.: US 10,270,919 B2
(45) Date of Patent: Apr. 23, 2019

(54) IMAGE FORMING APPARATUS, IMAGE DATA TRANSMISSION METHOD, AND COMPUTER PROGRAM

(71) Applicant: Konica Minolta, Inc., Chiyoda-ku, Tokyo (JP)

(72) Inventors: Takanobu Sugiyama, Toyokawa (JP); Takashi Oikawa, Toyohashi (JP); Tatsuya Kitaguchi, Toyokawa (JP); Shumpei Iwaoka, Toyokawa (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 15/172,808

(22) Filed: Jun. 3, 2016

(65) Prior Publication Data

US 2016/0360047 A1    Dec. 8, 2016

(30) Foreign Application Priority Data

Jun. 4, 2015   (JP) .................................. 2015-114049

(51) Int. Cl.
*G06F 3/12* (2006.01)
*H04N 1/00* (2006.01)
*H04L 12/58* (2006.01)

(52) U.S. Cl.
CPC ......... *H04N 1/00095* (2013.01); *H04L 51/28* (2013.01); *H04N 1/00244* (2013.01); *H04N 1/00411* (2013.01); *H04L 51/10* (2013.01)

(58) Field of Classification Search
None
See application file for complete search history.

(56) References Cited

U.S. PATENT DOCUMENTS 7,000,157 B2 * 2/2006 Okamoto ................. H04N 1/00
                                                            709/206
9,924,047 B2 * 3/2018 Terao ................. H04N 1/32096
(Continued)

FOREIGN PATENT DOCUMENTS

CN       1678006 A    10/2005
CN     104349014 A     2/2015
(Continued)

OTHER PUBLICATIONS

First Office Action issued by the State Intellectual Porperty Office of the People's Republic of China on Apr. 28, 2018 in corresponding Chinese Application No. 201610379686.9 with English language translation (16 pages).
(Continued)

*Primary Examiner* — Dung D Tran
(74) *Attorney, Agent, or Firm* — Buchanan Ingersoll & Rooney PC (57) ABSTRACT

An image forming apparatus includes: a reception unit configured to receive identifiers for communication of respective destinations from a first server; a display unit configured to display a screen to make an user select any one of the identifiers as an address of image data; and a transmission unit configured to transmit the image data to the selected identifier when any one of the identifiers has been selected and to transmit the image data to a transmission device for storing the identifier or a second server from which the transmission device downloads the data when the identifier is not received.

18 Claims, 11 Drawing Sheets

(56) References Cited

U.S. PATENT DOCUMENTS

| | | | | |
|---|---|---|---|---|
| 2007/0223031 A1* | 9/2007 | Kitada | ................... | G06Q 10/10 |
| | | | | 358/1.15 |
| 2012/0147436 A1* | 6/2012 | Nishiyama | ......... | H04N 1/32096 |
| | | | | 358/406 |
| 2013/0278960 A1* | 10/2013 | Nishiyama | ........... | H04N 1/0084 |
| | | | | 358/1.14 |
| 2014/0059072 A1* | 2/2014 | Kawara | ............. | G06F 17/30011 |
| | | | | 707/769 |
| 2015/0046975 A1* | 2/2015 | Kato | ....................... | H04L 63/08 |
| | | | | 726/3 |
| 2016/0044186 A1* | 2/2016 | Inoue | ................ | H04N 1/00209 |
| | | | | 358/1.15 |

FOREIGN PATENT DOCUMENTS

| | | |
|---|---|---|
| JP | 2005-269094 A | 9/2005 |
| JP | 2011-160463 A | 8/2011 |
| JP | 2012-70342 A | 4/2012 |

OTHER PUBLICATIONS

Second Office Action issued by the State Intellectual Property Office of the People's Republic of China in Application No. 201610379686.9 on Feb. 1, 2019 and English translation (16 pgs).

* cited by examiner

| NAME | FACSIMILE NUMBER | EMAIL ADDRESS |
|---|---|---|
| AAA CORPORATION | 012-345-6789 | aaa@example.com |
| ABCDE BANK | 012-333-3333 | abcde@mail.example.net |
| AOKI | 019-999-9999 | aoki@xyz.example.com |
| ANDOH | 012-333-4444 | andoh@aaa.bbb.ccc |
| ABCXYZ CORPORATION | 019-000-0001 | abcxyz@zzz.zzz |
| ... | ... | ... |

| NAME | FACSIMILE NUMBER OR EMAIL ADDRESS | USER CODE (OF COMMANDER) | TRANSMISSION DATE AND TIME |
|---|---|---|---|
| AAA CORPORATION | 012-345-6789 | A0001 | 2015/1/23 16:16 |
| SUZUKI | suzuki@aaa.zzz | A0123 | 2015/1/23 13:26 |
| ... | ... | ... | ... |

IMAGE FORMING APPARATUS, IMAGE DATA TRANSMISSION METHOD, AND COMPUTER PROGRAM

The entire disclosure of Japanese Patent Application No. 2015-114049 filed on Jun. 4, 2015 including description, claims, drawings, and abstract are incorporated herein by reference in its entirety.

BACKGROUND OF THE INVENTION

Field of the Invention

The present invention relates to a technique for transmitting image data from an image forming apparatus.

Description of the Related Art

An image forming apparatus has been widely used for integrating functions such as copy, network print, fax, scan, and box. The image forming apparatus is referred to as a "combined machine" or a "multi function peripherals (MFP)".

In addition, in recent years, various functions for transmitting data of an image to an external device such as a function for transmitting an email and a function for uploading data to an external server have been provided in the image forming apparatus.

In this way, in recent years, the image forming apparatus can transmit the data of the image to the external device by using various methods.

Even when the data is transmitted to the same person, an identifier to be specified is different for each transmission method. For example, when the data is transmitted via a facsimile, a facsimile number is specified. When the data is transmitted via the email, an email address is specified. When the data is transmitted to a folder provided in a server, a network path of the folder (for example, uniform resource locator (URL)) is specified.

Traditionally, these identifiers (facsimile number, email address, network path, and the like) are often recorded in an address book.

The address book can be managed by the image forming apparatus. However, it is possible that the address book is managed by the server and the image forming apparatus accesses the server and refers to the address book as necessary.

Especially, in an environment in which a plurality of image forming apparatuses is used (for example, office of company), it is useful to integrally manage the address book by the server and share it by the image forming apparatuses. Further, with the growth of cloud computing, there is a case where the address book is shared by not only the image forming apparatuses but also a different kind of an information apparatus such as a smart phone and a tablet computer.

The image forming apparatus may be shared by a number of users. When the address book is managed by the image forming apparatus, a larger storage area is needed than that in a case where the image forming apparatus is used for private.

When the address book is managed by the server, storage media such as a hard disk of the image forming apparatus can be reduced.

When the address book is managed by the server and the image forming apparatus accesses the server and refers to the address book as necessary, these merits can be obtained.

However, any malfunction may cause a case where the image forming apparatus cannot access the address book. In this case, the following solutions have been proposed.

An MFP which can communicate with the server via a LAN obtains address information corresponding to an address ID included in the registered transfer setting from the server and transfers the received image data. Further, the MFP determines a cause when the address information cannot be obtained. When a communication error with the server causes the problem, the MFP does not invalidate the registered transfer setting. When no address information held in the server causes the problem, the MFP invalidates the registered transfer setting (JP 2012-70342 A).

Further, the following network system which can change the destination and transmission method of information according to the operation of the user has been proposed. In the network system in which a plurality of terminals which is a network compatible apparatus is connected to a server terminal via the network, when a terminal specified at the transmission to the terminal on the network cannot receive or output data, this situation is informed an operator before a transmission terminal performs transmission (JP 2005-269094 A).

In addition, the following image transmission device has been proposed. The image transmission device includes an input unit which inputs an image, an authentication unit which authenticates a user, an acquisition unit which obtains address information corresponding to the user authenticated by the authentication unit, a holding unit which holds an address information group including a plurality of pieces of address information set as a transmission address of the image, a transmission unit which transmits the image by using each piece of the address information included in the address information group according to an instruction to start transmission from the user, an operation key which sets the address information corresponded to the user authenticated by the authentication unit as the transmission address, and an addition unit which adds the address information obtained by the acquisition unit to the address information group according to an operation to the operation key (JP 2011-160463 A).

However, according to the traditional method, when an access to the address book managed by the server is not available, data cannot be transmitted to a target destination. In this case, conventionally, the user needs to check the facsimile number or the email address of the destination and input the identifier character by character by operating numeric keys and the like.

SUMMARY OF THE INVENTION

The present invention has been made in view of the above problems, and an object thereof is to transmit image data from an image forming apparatus to a destination easier than before for a user when an access to an address book managed by a server by the image forming apparatus is not available.

To achieve the abovementioned object, according to an aspect, an image forming apparatus reflecting one aspect of the present invention comprises: a reception unit configured to receive identifiers for communication of respective destinations from a first server; a display unit configured to display a screen to make an user select any one of the identifiers as an address of image data; and a transmission unit configured to transmit the image data to the selected identifier when any one of the identifiers has been selected and to transmit the image data to a transmission device for storing the identifier or a second server from which the transmission device downloads the data when the identifier is not received.

The display unit preferably displays a second screen indicating the transmission device and the second server as an alternative instead of the screen when the identifier is not received, and the transmission unit preferably transmits the image data to one of the transmission device and the second server which has been selected by the user.

Further, the second screen preferably indicates a second identifier which has been specified by the user as the address as the alternative instead of the transmission device and the second server or together with the transmission device and the second server, and when the second identifier has been selected, the transmission unit preferably transmits the image data to the selected second identifier instead of the transmission device and the second server.

Further, the second identifier is preferably an identifier which has been specified by the user as the address when the identifier has not been received before.

Furthermore, the second screen preferably indicates a device to which the image data is transmitted from among the transmission device, the second server, and the second identifier according to a function available for the user.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

Hereinafter, an embodiment of the present invention will be described with reference to the drawings. However, the scope of the invention is not limited to the illustrated examples.

Figure 1:
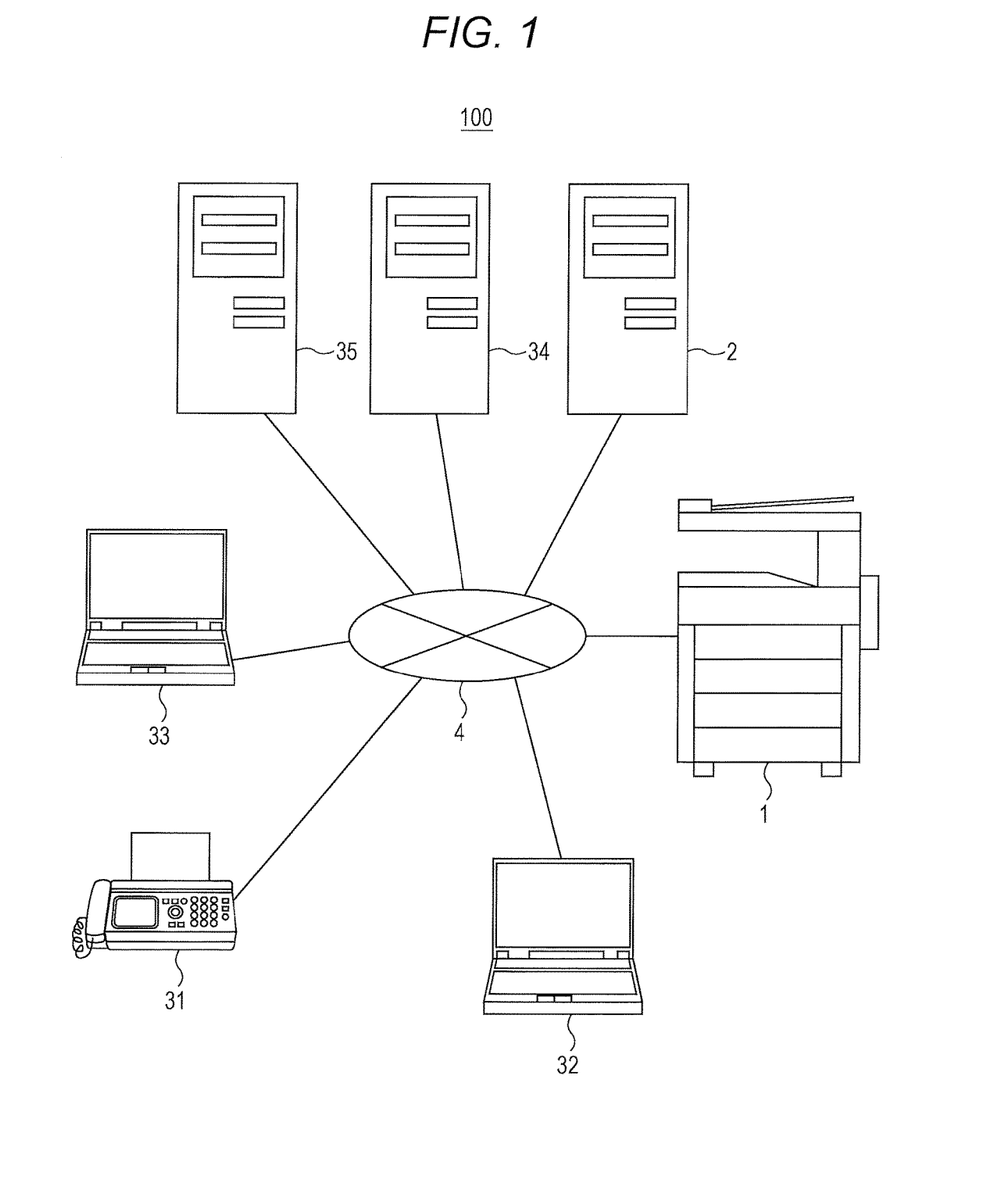
FIG. 1 is a diagram of an exemplary structure of an entire image transmission/reception system.
Figure 2:
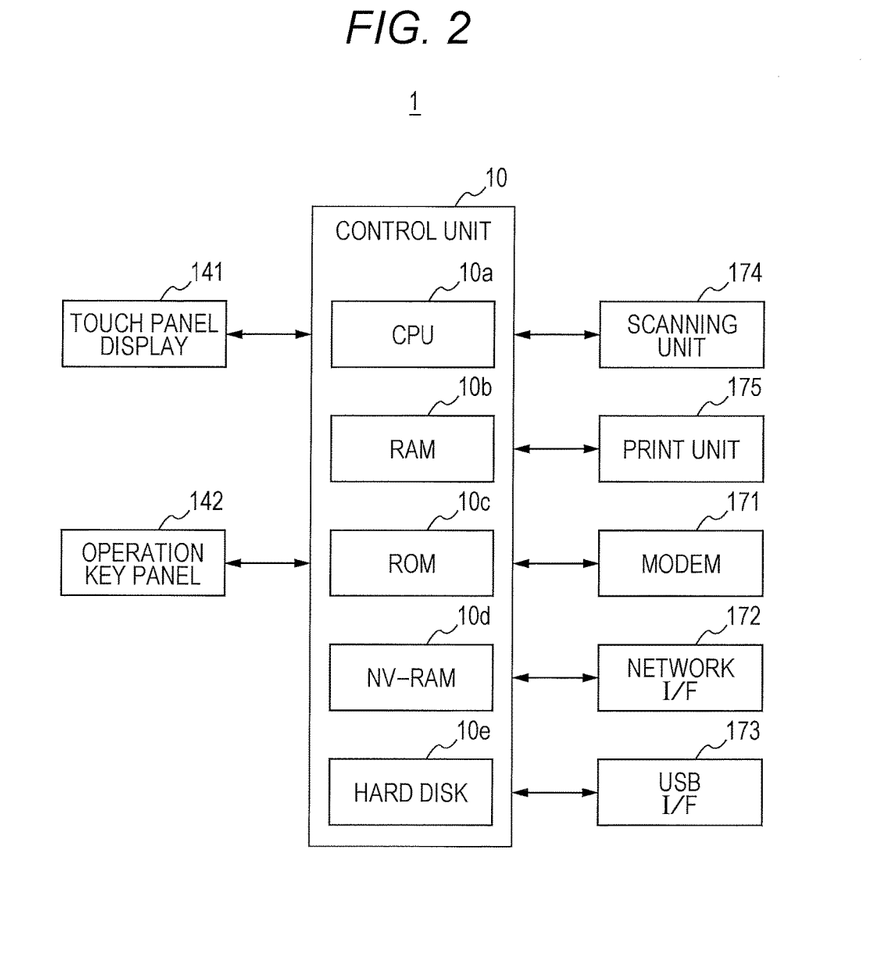
FIG. 2 is a diagram of an exemplary hardware configuration of an image forming apparatus.
Figure 3:
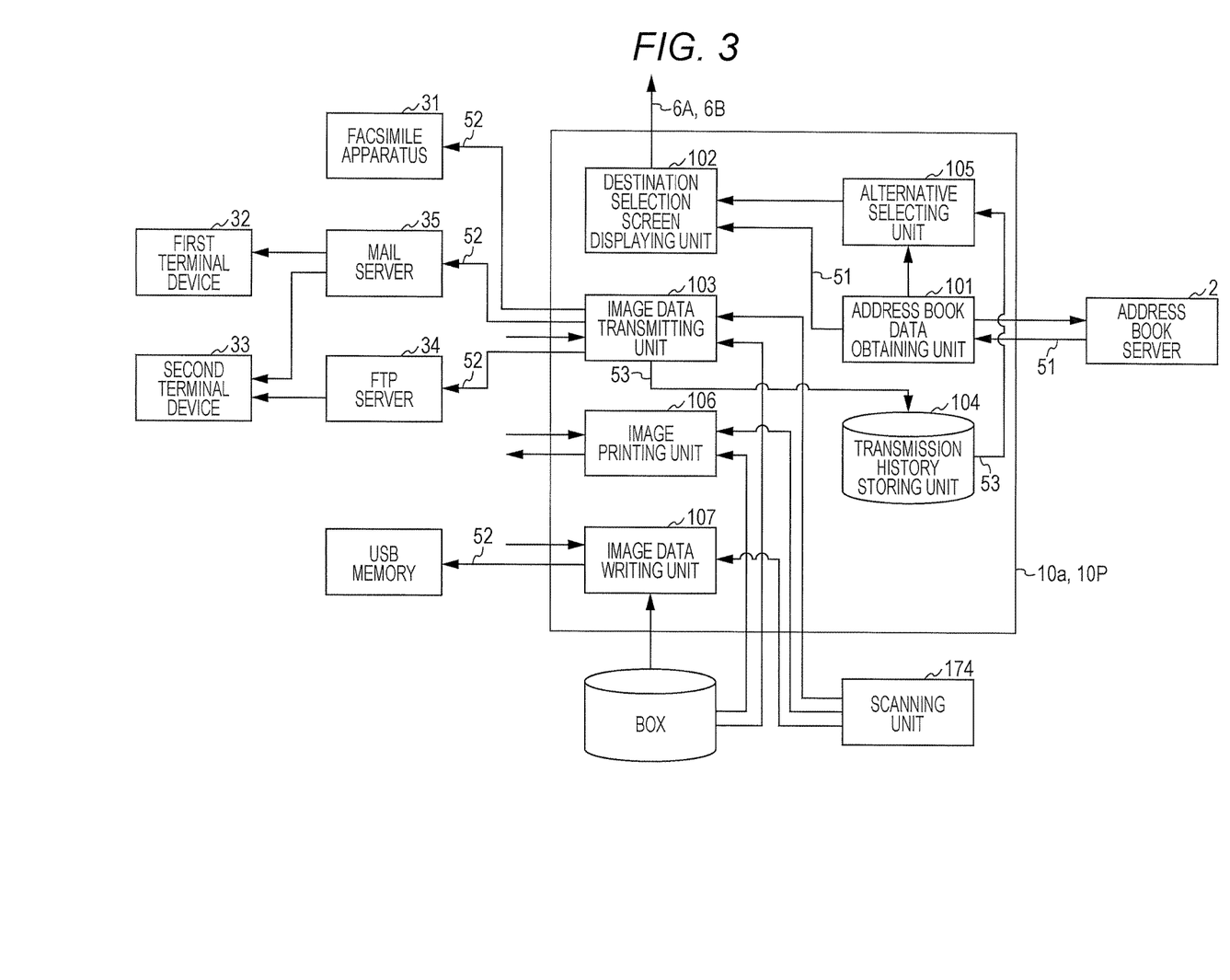
FIG. 3 is a diagram of an exemplary functional configuration of the image forming apparatus.

FIG. 1 is a diagram of an entire exemplary structure of an image transmission/reception system 100. FIG. 2 is a diagram of an exemplary hardware configuration of an image forming apparatus 1. FIG. 3 is a diagram of an exemplary functional configuration of the image forming apparatus 1.

As illustrated in FIG. 1, the image transmission/reception system 100 includes the image forming apparatus 1, an address book server 2, a facsimile apparatus 31, a first terminal device 32, a second terminal device 33, a file server 34, a mail server 35, a communication line 4, and the like.

The image forming apparatus 1 can communicate with the address book server 2, the facsimile apparatus 31, the first terminal device 32, the second terminal device 33, and the file server 34 via the communication line 4. As the communication line 4, the Internet, a local area network (LAN), a fixed telephone line, and a mobile phone line are used.

A case where the image forming apparatus 1 and the address book server 2 are used in a company is described below. Each employee (user) of the company has a single user account used to login the image forming apparatus 1. A unique user code (user ID) and a unique email address are set for each user account.

The image forming apparatus 1 is an apparatus for integrating functions such as copy, network print, fax, scan, and box. Generally, the image forming apparatus 1 is referred to as a "combined machine" or a "multi function peripherals (MFP)".

The box function is a function to provide a storage area for each user and to store and manage data in file units by each user by using own storage area. The storage area is referred to as a "box" or a "personal box". The box corresponds to a "folder" or a "directory" in a personal computer.

As illustrated in FIG. 2, the image forming apparatus 1 includes a control unit 10, a touch panel display 141, an operation key panel 142, a modem 171, a network interface 172, a universal serial bus (USB) interface 173, a scanning unit 174, a print unit 175, and the like.

The control unit 10 includes a central processing unit (CPU) 10a, a random access memory (RAM) 10b, a read only memory (ROM) 10c, a nonvolatile random access memory (NV-RAM) 10d, and a hard disk 10e.

The touch panel display 141 displays a screen displaying a message to the user, a screen to input a command or information by the user, a screen displaying the result of processing executed by the CPU 10a. Further, the touch panel display 141 transmits a signal indicating the touched position to the CPU 10a.

The operation key panel 142 is a so-called hardware keyboard and includes numeric keys, a start key, a stop key, a function key, and the like.

The modem 171 transmits/receives the image data to/from the facsimile apparatus 31 by using a protocol such as the G3.

The network interface 172 communicates with the address book server 2, the first terminal device 32, the second terminal device 33, and the file server 34 by using a protocol such as the transmission control protocol/Internet protocol (TCP/IP). A network interface card (NIC) or a wireless LAN card is used as the network interface 172.

The USB interface 173 obtains data from a peripheral device corresponding to the USB and transfers the data to the peripheral device. In the present embodiment, especially, the USB interface 173 is used to write the image data to a USB memory.

The scanning unit 174 reads an image written on a sheet set on a platen glass and generates the image data.

The print unit 175 prints the image read by the scanning unit 174 on a paper sheet. Further, the print unit 175 prints the image on the paper sheet based on the image data input by the modem 171, the network interface 172, or the USB interface 173.

A program to realize the function such as copy is stored in the ROM 10c, the NV-RAM 10d, or the hard disk 10e. In addition, an address book service program 10P is stored.

The address book service program 10P is a program to provide an address book for compiling facsimile numbers and email addresses to the user by cooperating with the address book server 2. The user can select a destination of the image data obtained by the scanning unit 174 or the image data stored in the box from the address book. The address book is generally provided from the address book server 2.

These programs are loaded to the RAM 10*b* as necessary and are executed by the CPU 10*a*.

The single image forming apparatus 1 is illustrated in FIG. 1. However, a plurality of image forming apparatuses 1 may be provided in the image transmission/reception system 100.

The address book server 2 integrally manages the data of contact information (facsimile number and email address) of concerned people (location and customer) of the company. The address book server 2 provides the data to the image forming apparatus 1 as necessary. As the address book server 2, a known server for managing the address book is used.

The facsimile apparatus 31 is a so-called facsimile terminal and transmits/receives the image data by using the protocol such as the G3. Further, an image forming apparatus may be used as the facsimile apparatus 31.

The first terminal device 32 is an information processing device including a mailer and is used to receive an email to which the image data is attached as an attachment from the image forming apparatus 1.

Similarly to the first terminal device 32, the second terminal device 33 also includes the mailer and is used for the same purpose. In addition, the second terminal device 33 includes a program (for example, web browser) to download a file from the file server 34.

A personal computer, a smart phone, or a tablet computer is used as the first terminal device 32 and the second terminal device 33.

The file server 34 receives the file from the image forming apparatus 1 and the like and stores it. Further, the file server 34 transmits the stored file according to a request from the second terminal device 33. A known file server is used as the file server 34. For example, a file transfer protocol (FTP) server or a network attached storage (NAS) is used.

Similarly to the box in the image forming apparatus 1, the folder for each user is provided in the file server 34. Each user can transmit the file to the user's own folder by using the FTP.

As described above, according to the address book service program 10P, the address book is provided from the address book server 2 to the image forming apparatus 1, and the image forming apparatus 1 presents address book to the user. However, there is a case where the image forming apparatus 1 cannot access the address book server 2 due to a malfunction of the address book server 2 or the communication line 4. The address book service program 10P has a structure to cope with the above case.

The function realized by the address book service program 10P is described below as focusing on the structure.

By using the address book service program 10P, the image forming apparatus 1 realizes functions such as an address book data obtaining unit 101, a destination selection screen displaying unit 102, an image data transmitting unit 103, a transmission history storing unit 104, an alternative selecting unit 105, an image printing unit 106, and an image data writing unit 107 illustrated in FIG. 3.

[A Case Where Access to Address Book Server 2 is Available]

Figure 4:
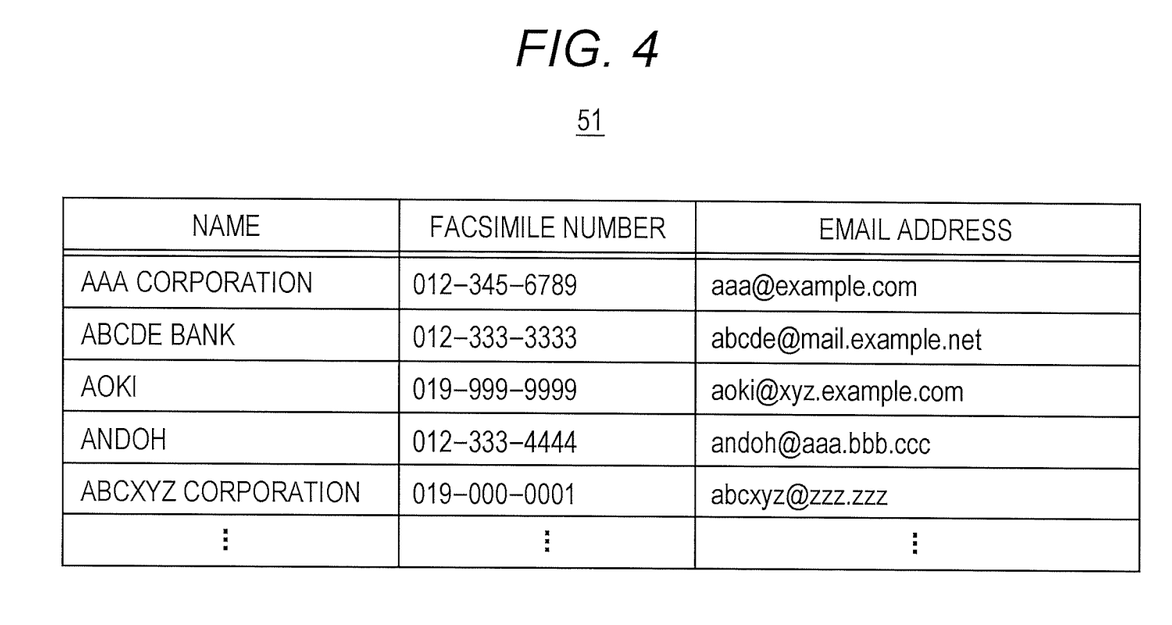
FIG. 4 is a diagram of exemplary address book data.
Figure 5:
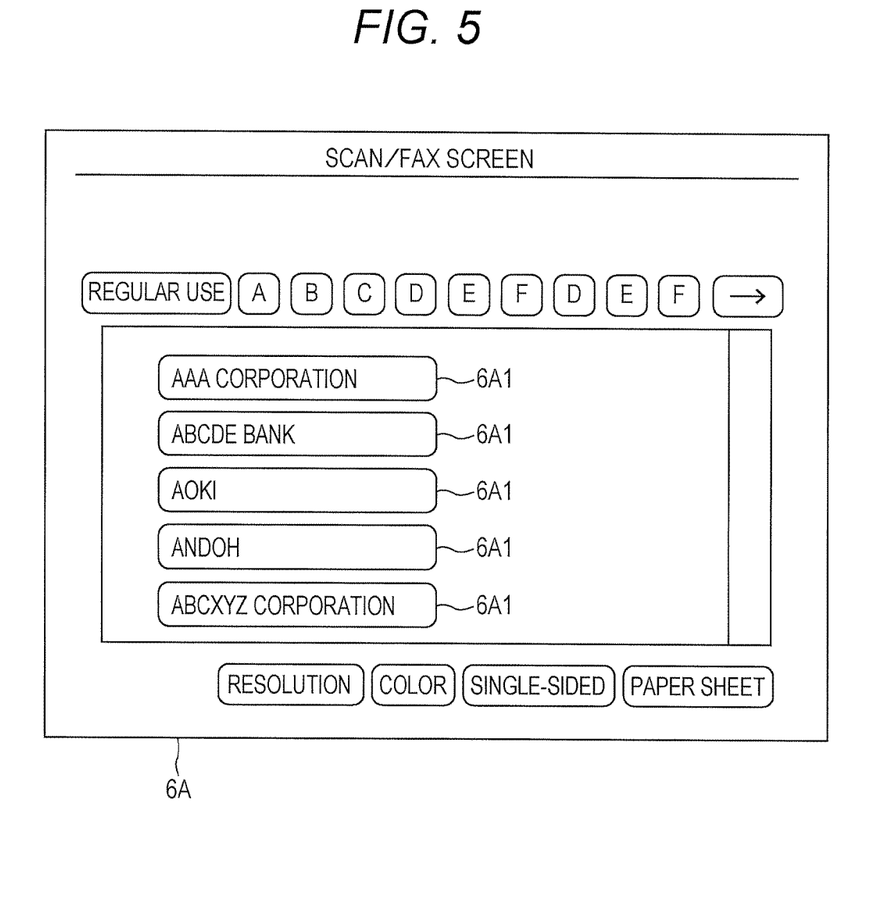
FIG. 5 is a diagram of an exemplary destination selection screen.
Figure 6:
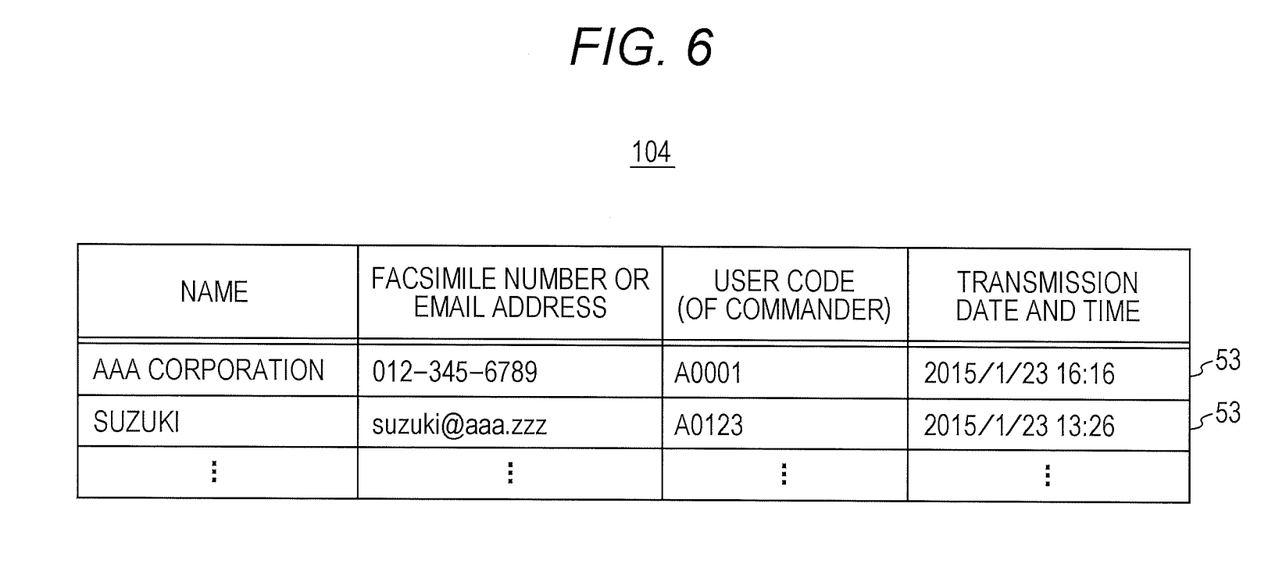
FIG. 6 is a diagram of exemplary transmission result data.

FIG. 4 is a diagram of exemplary address book data 51. FIG. 5 is a diagram of an exemplary destination selection screen 6A. FIG. 6 is a diagram of exemplary transmission result data 53.

The user logins the image forming apparatus 1 by using own user code. The user sets a paper sheet to which an image to be transmitted is written to the scanning unit 174. The image to be transmitted is referred as a "target image" below. Further, the user who logins the image forming apparatus 1 is referred to as a "login user". Alternatively, image data of the target image is specified from among the image data stored in the box. Then, a command to retrieve the address book is input.

The address book data obtaining unit 101 obtains the address book data 51 as follows.

The address book data obtaining unit 101 accesses the address book server 2 and requests the data of the address book to the address book server 2.

When receiving the request, the address book server 2 transmits the address book data 51 to the image forming apparatus 1. The address book data obtaining unit 101 receives the address book data 51.

As illustrated in FIG. 4, a name, a facsimile number, and an email address of each concerned person of the company is written in the address book data 51.

The address book server 2 may transmit the address book data 51 to the image forming apparatus 1 part by part. For example, the data of the concerned people whose name starts with "A" is transmitted first. After that, according to the operation by the login user, the data of the concerned people whose name starts with the other letter may be transmitted.

The destination selection screen displaying unit 102 displays the destination selection screen 6A on the touch panel display 141 based on the address book data 51. As illustrated in FIG. 5, buttons 6A1 respectively corresponding to the concerned people in the address book data 51 are arranged in the destination selection screen 6A.

Here, the login user selects any one of the concerned people by pressing the button 6A1 corresponding to the concerned person as the destination of the target image. In addition, the login user specifies one of facsimile and email as a transmission method. Then, the login user inputs a transmission command.

The image data transmitting unit 103 transmits the target image to the concerned person selected as the destination of the target image as follows.

When the paper sheet is set to the scanning unit 174, the image data transmitting unit 103 controls the scanning unit 174 to read the image written on the paper sheet and generate the image data. Alternatively, when any one of image data stored in the box is specified, the image data is read from the box.

The image data generated by the scanning unit 174 or read from the box is the image data of the target image. The image data is referred to as "target image data 52" below.

When the login user selects the facsimile as the transmission method, the image data transmitting unit 103 controls the modem 171 to dial the facsimile number of the concerned person selected as the destination of the target image and transmit the target image data 52.

On the other hand, when the login user selects the email as the transmission method, the image data transmitting unit 103 generates an email to which the target image data 52 is attached as the attachment. The image data transmitting unit 103 controls the network interface 172 to transmit the email to the email address of the concerned person selected as the destination of the target image. Accordingly, the email is uploaded to the mail server 35. After that, the first terminal device 32 downloads the email from the mail server 35.

According to the above processing, the target image data 52 is transmitted to the facsimile apparatus 31 corresponding to the facsimile number or the first terminal device 32 corresponding to the email address.

The transmission history storing unit 104 stores the transmission result data 53 including the name of the concerned person selected as the destination, the facsimile number or the email address of the destination, the user code of the login user, the transmission data, and the like at every transmission of the target image data 52. As a result, as illustrated in FIG. 6, the transmission result data 53 is accumulated in the transmission history storing unit 104.

[A Case Where Access to Address Book Server 2 is Not Available]

Figure 7:
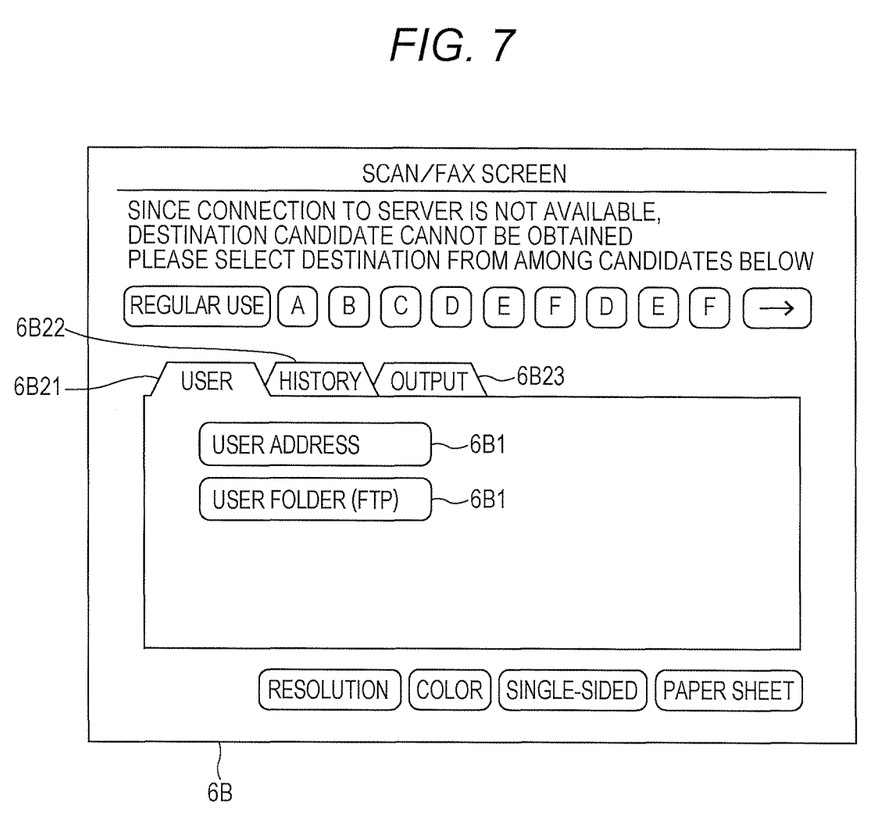
FIG. 7 is a diagram of an exemplary alternative output selection screen.
Figure 8:
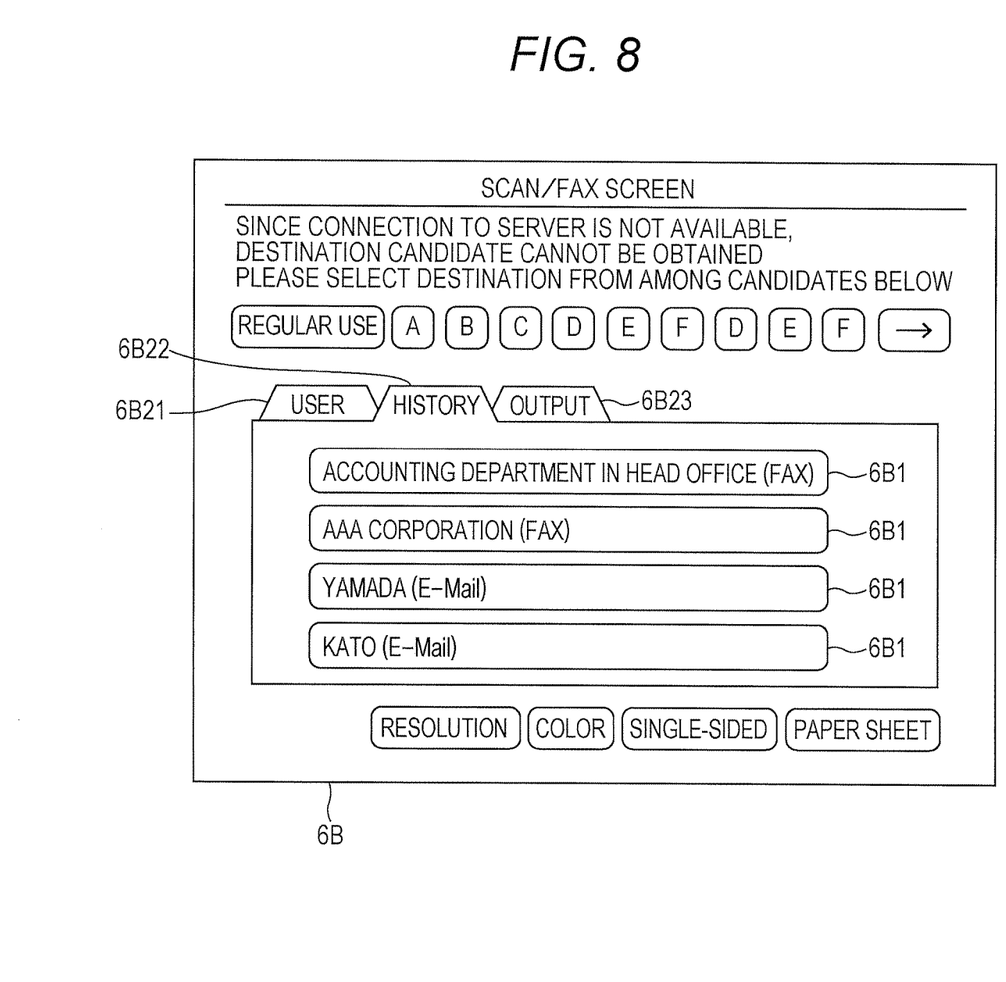
FIG. 8 is a diagram of an exemplary alternative output selection screen.
Figure 9:
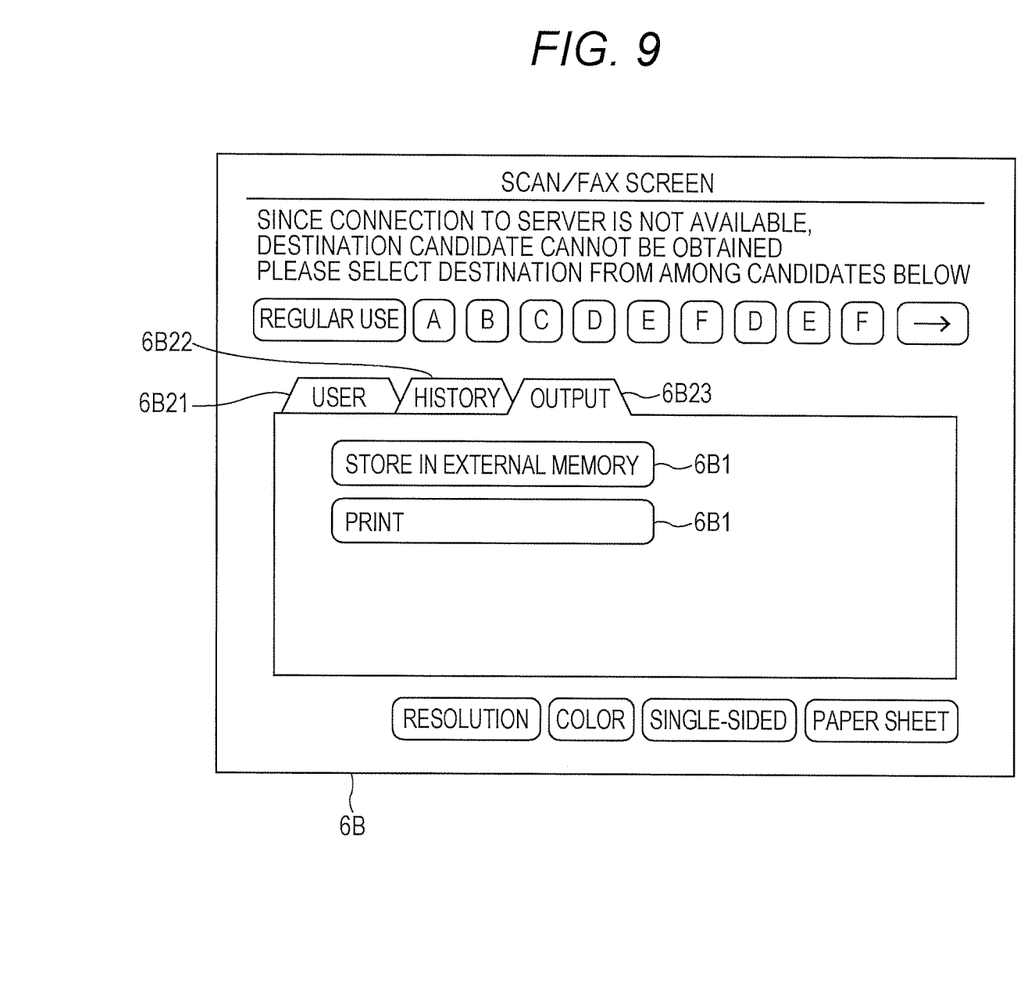
FIG. 9 is an exemplary alternative output selection screen.

FIGS. 7 to 9 are diagrams of exemplary alternative output selection screens 6B.

There are cases where the address book data obtaining unit 101 cannot obtain the address book data 51 from the address book server 2 due to some malfunction. In this case, each unit of the image forming apparatus 1 performs processing as follows.

When the address book data obtaining unit 101 does not obtain the address book data 51 from the address book server 2, the alternative selecting unit 105 selects a candidate to be presented to the login user instead of the concerned person written in the address book data 51 (referred to as an "alternative") as follows. The destination selection screen displaying unit 102 displays a screen instead of the destination selection screen 6A on the touch panel display 141 according to the selected alternative as follows.

The alternative selecting unit 105 selects the email address of the login user and a folder of the login user provided in the file server 34 (referred to as a "personal folder" below) as the alternative. Data in which the email address and the personal folder of each user are written has been previously stored in the hard disk 10e and the like.

The destination selection screen displaying unit 102 displays the alternative output selection screen 6B on the touch panel display 141 every time when the alternative selecting unit 105 selects the alternative. As illustrated in FIG. 7, buttons 6B1 corresponding to the respective alternatives selected by the alternative selecting unit 105 and tabs 6B21 to 6B23 are arranged in the alternative output selection screen 6B.

Alternatively, when the tab 6B22 is pressed, the alternative selecting unit 105 selects the destination, to which the target data has been transmitted by the login user in the past, as the alternative from among the destinations of which the transmission result data 53 is stored in the transmission history storing unit 104. Specifically, the transmission result data 53 indicating the user codes of the login users is extracted, and the destination written in the extracted transmission result data 53 is selected.

The destination selection screen displaying unit 102 updates the alternative output selection screen 6B so that the buttons 6B1 respectively corresponding to the selected alternatives are arranged as illustrated in FIG. 8.

However, when the transmission to the destination is performed via the facsimile, in the button 6B1 corresponding to the destination, the name of the concerned person corresponding to the destination is indicated together with a string such as "(FAX)". On the other hand, when the transmission to the destination is performed via the email, the name of the concerned person is indicated together with a string such as "(E-Mail)". When the facsimile number is written in the transmission result data 53 of the destination, it can be found that the transmission has been performed via the facsimile. On the other hand, when the email address is written, it can be found that the transmission has been performed via the email.

Alternatively, when the tab 6B23 is pressed, the alternative selecting unit 105 selects to output the data to an external memory (in the present embodiment, USB memory) and to print the data to the paper sheet as the alternative.

The destination selection screen displaying unit 102 updates the alternative output selection screen 6B so that the buttons 6B1 respectively corresponding to the selected alternatives are arranged as illustrated in FIG. 9.

When the tab 6B21 is pressed, the alternative selecting unit 105 selects the email address of the login user and the folder of the login user provided in the file server 34 as the alternative again. The destination selection screen displaying unit 102 updates the alternative output selection screen 6B so that the buttons 6B1 respectively corresponding to the selected alternatives are arranged as illustrated in FIG. 7.

The user searches for the button 6B1 corresponding to an output method of the target image as appropriately pressing any one of the tabs 6B21 to 6B23 and switching the content in the alternative output selection screen 6B. Then, the button 6B1 is pressed.

Any one of the image data transmitting unit 103, the image printing unit 106, and the image data writing unit 107 performs processing as follows.

The alternative corresponding to the pressed button 6B1 indicates any one of concerned people (destination) and is based on the transmission result data 53 (refer to FIG. 8), the image data transmitting unit 103 transmits the target image data 52 to the facsimile number or the email address indicated in the transmission result data 53. The details of the processing have been described in "a case where the access to the address book server 2 is available".

That is, the image data transmitting unit 103 prepares the target image data 52 by making the scanning unit 174 read the target image or reading the image data from the box. The modem 171 is controlled to transmit the target image data 52 by dialing to the facsimile number or the network interface 172 is controlled to transmit the email to which the target image data 52 is attached to the email address.

Further, when the pressed button 6B1 corresponds to the email address or the personal folder of the login user (refer to FIG. 7), the target image data 52 is prepared by using the above described method. When the pressed button 6B1 corresponds to the email address, the network interface 172 is controlled to transmit the email to which the target image data 52 is attached to the email address. When the pressed button 6B1 corresponds to the personal folder, the network interface 172 is controlled to access the file server 34 and upload the target image data 52 to the personal folder.

When the alternative corresponding to the pressed button 6B1 indicates the write to the USB memory, the image printing unit 106 prepares the target image data 52 by using the above method. The image printing unit 106 controls the USB interface 173 to write the target image data 52 to the USB memory. The login user previously sets the USB memory to the USB interface 173.

When the alternative corresponding to the pressed button 6B1 indicates the print, the image data writing unit 107 prepares the target image data 52 by using the above method. The image data writing unit 107 controls the print unit 175 to print the target image on the paper sheet based on the target image data 52.

When the login user has transmitted the target image data 52 to own email address by using the image forming apparatus 1, the login user can receive the target image data 52 from the mail server 35 by the second terminal device 33. Alternatively, when the login user has uploaded the target image data 52 to own personal folder by using the image forming apparatus 1, the login user can make the second terminal device 33 access the file server 34 and download the target image data 52.

When the login user prepares the target image data 52 in the second terminal device 33 in this way, the login user transmits the email to which the target image data 52 is attached to the original destination of the target image by using the address book stored in the second terminal device 33.

Figure 10:
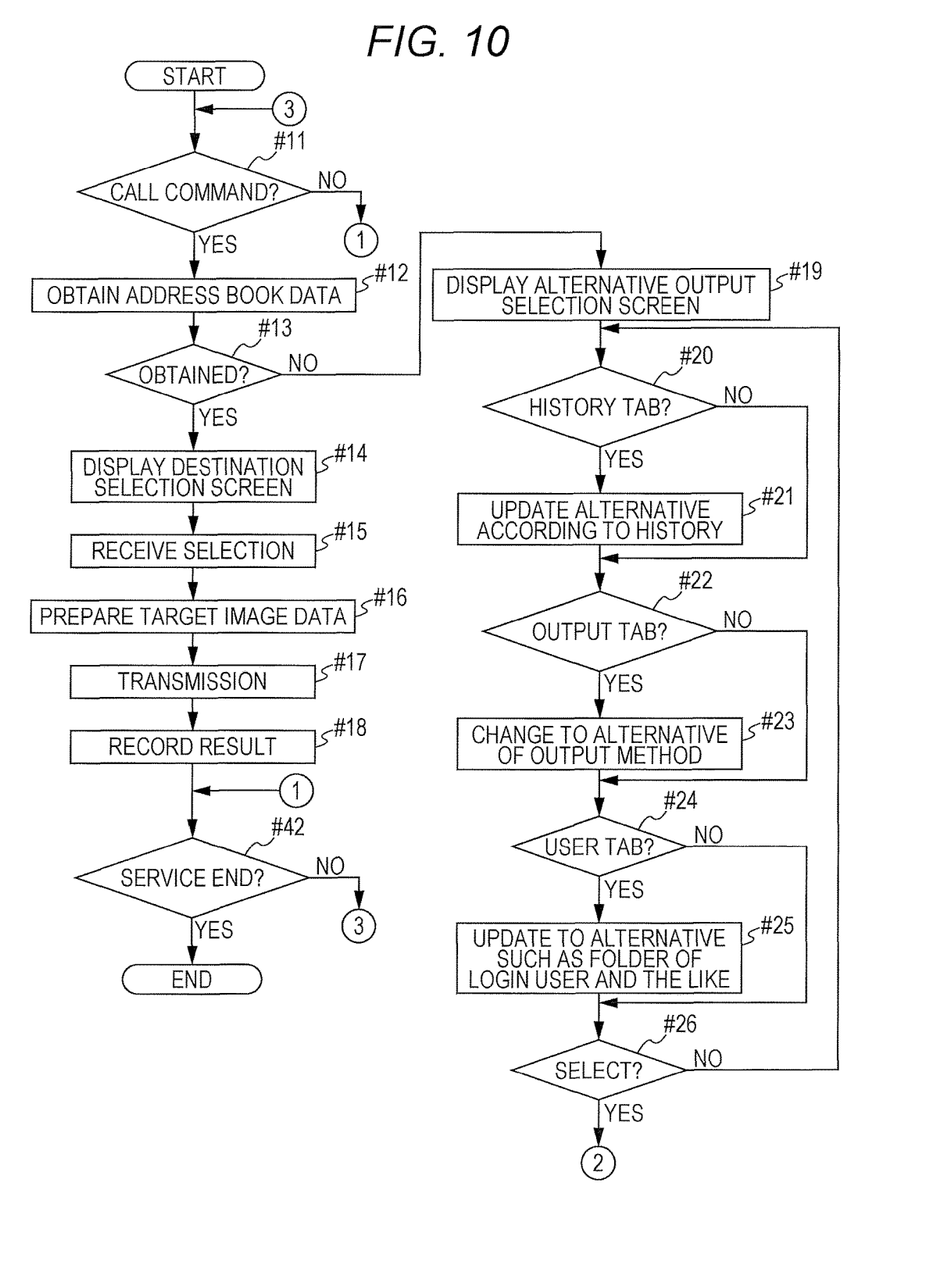
FIG. 10 is a flowchart to describe an example of an entire processing flow of the image forming apparatus.
Figure 11:
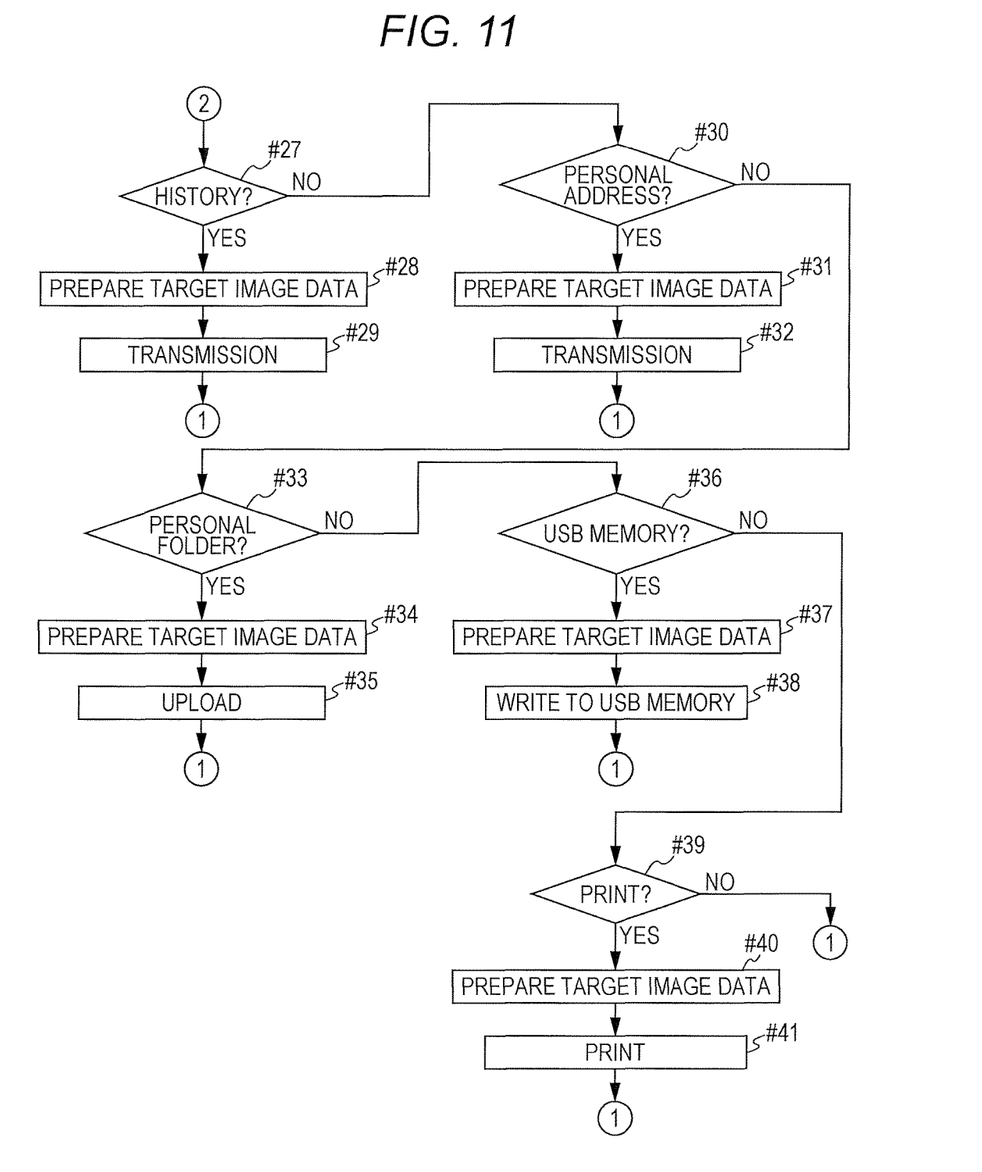
FIG. 11 is a flowchart to describe an example of an entire processing flow of the image forming apparatus.

FIGS. 10 and 11 are flowcharts to describe an example of an entire processing flow of the image forming apparatus 1.

Next, the flow of the entire processing performed by the image forming apparatus 1 based on the address book service program 10P is described with reference to FIGS. 10 and 11 together with the operation flow of the user.

The user logins the image forming apparatus 1. The user sets the paper sheet for the target image to the scanning unit 174 or specifies the image data of the target image. Then, a command to retrieve the address book is input.

When the command is input (Yes in #11 in FIG. 10), the image forming apparatus 1 tries to obtain the address book data 51 from the address book server 2 (#12).

When the address book data 51 has been obtained (Yes in #13), the image forming apparatus 1 displays the destination selection screen 6A (refer to FIG. 5) based on the address book data 51 (#14).

Here, the user (login user) selects the destination of the target image from the destination selection screen 6A and specifies the transmission method.

When receiving the selection or specified method (#15), the image forming apparatus 1 prepares the target image data 52 by scanning the paper sheet or reading the image data from the box (#16). The image forming apparatus 1 transmits the target image data 52 to the selected destination by using the specified method (#17) and records the data (transmission result data 53) indicating the transmission result (#18).

On the other hand, when the address book data 51 cannot be obtained (No in #13), the image forming apparatus 1 displays the alternative output selection screen 6B instead of the destination selection screen 6A in a state where the tab 6B21 has been selected by default (#19). In this state, as illustrated in FIG. 7, buttons corresponding to the email address and the personal folder of the login user are arranged in the alternative output selection screen 6B as the buttons 6B1.

When the login user presses the tab 6B22 (Yes in #20), as illustrated in FIG. 8, the image forming apparatus 1 arranges the buttons respectively corresponding to the destinations to which the login user has transmitted the target data in the past as the buttons 6B1 instead of the buttons 6B1 which are currently arranged (#21).

Further, when the login user presses the tab 6B23 (Yes in #22), as illustrated in FIG. 9, the image forming apparatus 1 arranges the buttons respectively corresponding to the write to the USB memory and the print on the paper sheet as the buttons 6B1 instead of the buttons 6B1 which are currently arranged (#23).

Alternatively, when the login user presses the tab 6B21 (Yes in #24), as illustrated in FIG. 7, the image forming apparatus 1 arranges the buttons respectively corresponding to the email address and the personal folder of the login user as the buttons 6B1 again instead of the buttons 6B1 which are currently arranged (#25).

The login user searches for a desired alternative while appropriately updating the alternative output selection screen 6B by using the tabs 6B21 to 6B23. The login user presses the button 6B1 corresponding to the alternative.

Then (Yes in #26), the image forming apparatus 1 performs processing as follows according to the pressed button 6B1.

When the button 6B1 corresponds to any one of concerned people (destination) and is based on the transmission result data 53 (Yes in #27), the image forming apparatus 1 prepares the target image data 52 (#28) and transmits the target image data 52 to the facsimile number or the email address indicated in the transmission result data 53 (#29).

When the button 6B1 corresponds to the email address of the login user (Yes in #30), the image forming apparatus 1 prepares the target image data 52 (#31) and transmits the target image data 52 to the email address (#32).

When the button 6B1 corresponds to the personal folder of the login user (Yes in #33), the image forming apparatus 1 prepares the target image data 52 (#34) and accesses the file server 34 and uploads the target image data 52 to the personal folder (#35).

When the button 6B1 corresponds to the write to the USB memory (Yes in #36), the image forming apparatus 1 prepares the target image data 52 (#37) and writes the target image data 52 to the USB memory (#38).

When the button 6B1 corresponds to the print (Yes in #39), the image forming apparatus 1 prepares the target image data 52 (#40) and prints the target image on the paper sheet based on the target image data 52 (#41).

When providing the service for transmitting the target image, the image forming apparatus 1 appropriately performs the processing in steps #11 to #41.

According to the present embodiment, when the image forming apparatus 1 cannot obtain the address book data 51 from the address book server 2, the target image data 52 can be transmitted from the image forming apparatus 1 to the destination more easily than before for the user.

In the present embodiment, the image forming apparatus 1 arranges the buttons 6B1 in the alternative output selection screen 6B (refer to FIGS. 7 to 9) without limitation. However, it is possible that the button 6B1 regarding the function which cannot be used by the login user is not arranged. That is, only the button 6B1 regarding the function which can be used by the login user may be arranged.

For example, when the read/write of the data by the USB memory is prohibited, the image forming apparatus 1 does not arrange the button 6B1 regarding the output to the USB memory.

When the access to the file server 34 is prohibited, the image forming apparatus 1 does not arrange the button 6B1 regarding the transmission (upload) to the personal folder.

Further, the image forming apparatus 1 extracts the destination which can be currently specified by the login user as the destination from the transmission result data 53 about the transmission which has been performed by the login user in the past. The image forming apparatus 1 arranges the buttons 6B1 based on the extracted transmission result data 53.

When there is a facsimile number or an email address which has been specified by the user as the destination of the image data in a case where the image forming apparatus 1 cannot obtain the address book data 51 in the past, the facsimile number or the email address may be more preferentially presented than the facsimile number and the email address regarding the other history. That is, the button 6B1 of the facsimile number or the email address may be preferentially arranged. The facsimile number or the email address can be extracted based on the transmission date and time indicated in the transmission result data 53 and the period in which the address book data 51 cannot be obtained from the image forming apparatus 1.

In the present embodiment, the file server 34 is exemplified as the destination of the target image data 52. However, a so-called cloud server may be used as the destination. Further, the user account of the login user in software (messenger) for transmitting/receiving a message may be used. The plurality of destinations may be used. In this case, it is preferable that the buttons 6B1 respectively corresponding to the destinations be arranged in the alternative output selection screen 6B.

In the present embodiment, the buttons 6B1 are arranged in three groups in the alternative output selection screen 6B. However, a single group of the buttons 6B1 may be arranged.

In the present embodiment, the image forming apparatus 1 transmits the target image data 52 to the second terminal device 33 via the file server 34 or the mail server 35. However, the image forming apparatus 1 may directly transmit the target image data 52 to the second terminal device 33 without using the servers. For example, when an operating system of the second terminal device 33 is Windows (registered trademark) of Microsoft Corporation, it is preferable that a shared folder be provided in the second terminal device 33 and that the target image data 52 be transmitted to the shared folder.

In the present embodiment, when the image forming apparatus 1 cannot receive the address book data 51, the image forming apparatus 1 outputs the target image data 52 by using the method according to the button 6B1 selected by the login user. However, the target image data 52 may be output by using a previously determined method regardless of the operation by the login user. For example, the target image data 52 may be transmitted to the email address of the login user. Further, the target image data 52 may be uploaded to the personal folder of the login user.

The whole/partial structures of the image transmission/reception system 100 and the image forming apparatus 1, the content of the processing, the order of the processing, the data structure, and the screen structure can be appropriately changed within the scope of the present invention.

Although the present invention has been described and illustrated in detail, it is clearly understood that the same is by way of illustrated and example only and is not to be taken by way of limitation, the scope of the present invention being interpreted by terms of the appended claims.

What is claimed is:

1. An image forming apparatus configured to transmit image data to a destination corresponding to a respective identification, the image forming apparatus comprising:
    a display unit;
    a transmitter; and
    a hardware processor configured to:
        receive first identifiers for communication with respective destinations from a first server which stores the first identifiers as addresses for the respective destinations, the destination being one of the destinations;
        when any one of the first identifiers is able to be received from the first server, transmit the image data to the destination, which corresponds to at least one of the first identifiers that is selected by a logged in user among the received first identifiers which are displayed on the display, with the transmitter; and
        when the first identifiers are not able to be received from the first server:
            (A) the display unit displaying a first screen indicating an email address of the logged in user and a personal folder of the logged in user as alternatives, the alternatives being retrieved from the received first identifiers previously received by the image forming apparatus;
            (B) transmit the image data to the personal folder of (i) a terminal device operable by the user, provided on a network with the image forming apparatus and storing second identifiers as addresses including the respective destination or (ii) a second server which the terminal device is configured to access and from which the terminal device downloads the image data from the personal folder, such that
            (C) the terminal device is configured to then transmit the image data to the respective destination corresponding to at least one of the second identifiers that is selected by the user among the stored second identifiers in the terminal device.

2. The image forming apparatus according to claim 1, wherein
    the display unit is configured to display a second screen indicating the terminal device and the second server as an alternative instead of a screen when the first identifiers are not able to be received from the first server, and
    the transmitter transmits the image data to one of the terminal device and the second server which has been selected by the user.

3. The image forming apparatus according to claim 2, wherein when the first identifiers are not received, the display unit further displays a third screen which indicates third identifiers which have been specified by the user as the address based on transmission history, and
    when at least one of the third identifiers has been selected, the transmitter transmits the image data to the selected third identifier.

4. The image forming apparatus according to claim 3, wherein the third identifier is an identifier which has been specified by the user as the address when the identifier has not been received before.

5. The image forming apparatus according to claim 3, wherein at least one of the second and third screens indicate identifiers according to a device or a function available for the user.

6. The image forming apparatus according to claim 1, wherein:
    the second server comprises a mail server or a file server; and
    the image data is transmitted to the destination of the mail server corresponding to an email address of the logged in user or the destination of the file server corresponding to a personal folder of the logged in user.

7. An image data transmission method of an image forming apparatus for transmitting image data to a destination corresponding to a respective identification, the method comprising:
    receiving first identifiers for communication with respective destinations from a first server which stores the first identifiers as addresses for the respective destinations, the destination being one of the destinations;
    when any one of the first identifiers is able to be received from the first server, transmitting the image data to the destination, which corresponds to at least one of the first identifiers that is selected by a logged in user among the received first identifiers which are displayed on a display; and when the first identifiers are not able to be received from the first server:
- (A) displaying a first screen indicating an email address of the logged in user and a personal folder of the logged in user as alternatives, the alternatives being retrieved from the received first identifiers previously received by the image forming apparatus;
- (B) transmitting the image data to the personal folder of (i) a terminal device operable by the user, provided on a network with the image forming apparatus and storing second identifiers as addresses including the respective destination or (ii) a second server which the terminal device is configured to access and from which the terminal device downloads the image data from the personal folder, such that
- (C) the terminal device is configured to then transmit the image data to the respective destination corresponding to at least one of the second identifiers that is selected by the user among the stored second identifiers in the terminal device.

8. The image data transmission method according to claim 7, wherein
the displaying displays a second screen indicating the terminal device and the second server as an alternative instead of the screen when the first identifiers are not able to be received from the first server, and
the transmitting transmits the image data to one of the terminal device or the second server which has been selected by the user.

9. The image data transmission method according to claim 8, wherein when the first identifiers are not received, displaying a third screen which indicates third identifiers which have been specified by the user before as the address based on transmission history, and
the transmitting transmits the image data to the selected third identifier when at least one of the third identifiers has been selected.

10. The image data transmission method according to claim 9, wherein the third identifier is an identifier which has been specified by the user as the address when the identifier has not been received before.

11. The image data transmission method according to claim 9, wherein at least one of the second and third screens indicate identifiers screen indicates a device to which the image data is transmitted from among the transmission device, the second server, and the second identifier according to a device or a function available for the user.

12. The image data transmission method according to claim 7, wherein:
the second server comprises a mail server or a file server; and
the image data is transmitted to the destination of the mail server corresponding to an email address of the logged in user or the destination of the file server corresponding to a personal folder of the logged in user.

13. A non-transitory recording medium storing a computer readable program executed by an computer of an image forming apparatus having a function to transmit image data to a destination corresponding to a respective identification, the program causing the computer to execute:
receiving first identifiers for communication with respective destinations from a first server which stores the first identifiers as addresses for the respective destinations, the destination being one of the destinations;

when any one of the first identifiers is able to be received from the first server, transmitting the image data to the destination, which corresponds to at least one of the first identifiers that is selected by a logged in user among the received first identifiers which are displayed on a display; and when the first identifiers are not able to be received from the first server:
- (A) displaying a first screen indicating an email address of the logged in user and a personal folder of the logged in user as alternatives, the alternatives being retrieved from the received first identifiers previously received by the image forming apparatus;
- (B) transmitting the image data to the personal folder of (i) a terminal device operable by the user, provided on a network with the image forming apparatus and storing second identifiers as addresses including the respective destination or (ii) a second server which the terminal device is configured to access and from which the terminal device downloads the image data from the personal folder, such that
- (C) the terminal device is configured to then transmit the image data to the respective destination corresponding to at least one of the second identifiers that is selected by the user among the stored second identifiers in the terminal device.

14. The non-transitory recording medium storing a computer readable program according to claim 13, wherein
the displaying displays a second screen indicating the terminal device and the second server as an alternative instead of the screen when the first identifiers are not able to be received from the first server, and
the transmitting transmits the image data to one of the terminal device or the second server which has been selected by the user.

15. The non-transitory recording medium storing a computer readable program according to claim 14, wherein when the first identifiers are not received, displaying a third screen which indicates third identifiers which have been specified by the user before as the address based on transmission history, and
the transmitting transmits the image data to the selected third identifier when at least one of the third identifiers has been selected.

16. The non-transitory recording medium storing a computer readable program according to claim 15, wherein
the third identifier is an identifier which has been specified by the user as the address when the identifier has not been received before.

17. The non-transitory recording medium storing a computer readable program according to claim 15, wherein at least one of the second and third screens indicate identifiers according to a device or a function available for the user.

18. The non-transitory recording medium storing a computer readable program according to claim 13, wherein:
the second server comprises a mail server or a file server; and
the image data is transmitted to the destination of the mail server corresponding to an email address of the logged in user or the destination of the file server corresponding to a personal folder of the logged in user.

* * * * *